US009458771B2

(12) United States Patent
Ling et al.

(10) Patent No.: US 9,458,771 B2
(45) Date of Patent: Oct. 4, 2016

(54) MULTI-ENGINE PERFORMANCE MARGIN SYNCHRONIZATION ADAPTIVE CONTROL SYSTEM AND METHOD (71) Applicant: HONEYWELL INTERNATIONAL INC., Morristown, NJ (US)

(72) Inventors: Richard Ling, Scottsdale, AZ (US); Grant Gordon, Peoria, AZ (US); Kevin Moeckly, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 702 days.

(21) Appl. No.: 13/870,302

(22) Filed: Apr. 25, 2013

(65) Prior Publication Data
US 2014/0283527 A1 Sep. 25, 2014

Related U.S. Application Data (60) Provisional application No. 61/804,836, filed on Mar. 25, 2013.

(51) Int. Cl.
*F02C 9/42* (2006.01)
*F02C 9/28* (2006.01)
(52) U.S. Cl.
CPC . *F02C 9/42* (2013.01); *F02C 9/28* (2013.01); *F05D 2270/02* (2013.01); *F05D 2270/052* (2013.01); *F05D 2270/13* (2013.01); *F05D 2270/303* (2013.01); *F05D 2270/44* (2013.01)
(58) Field of Classification Search
None
See application file for complete search history.

(56) References Cited

U.S. PATENT DOCUMENTS

| | | | |
|---|---|---|---|
| 3,100,095 A | 8/1963 | Jespersen | |
| 4,137,721 A | 2/1979 | Glennon et al. | |
| 4,147,035 A | 4/1979 | Moore et al. | |
| 4,277,945 A | 7/1981 | Esthimer et al. | |
| 4,644,744 A | 2/1987 | Mittendorf et al. | |
| 7,031,812 B1 | 4/2006 | Pettigrew et al. | |
| 7,236,876 B2 | 6/2007 | Sarlashkar et al. | |
| 8,036,844 B2 | 10/2011 | Ling et al. | |
| 8,068,997 B2 | 11/2011 | Ling et al. | |
| 2008/0275597 A1 | 11/2008 | Gaulmin et al. | |
| 2012/0060505 A1 | 3/2012 | Fuller et al. | |

OTHER PUBLICATIONS

Stramiello, Andrew D., et al.: "Aviation Diagnostic and Engine Prognostic Technology (ADEPT) For the Chinook's T-55 Engine" Presented at the American Helicopter Society 59th Annual Forum, Phoenix, Arizona, May 6-8, 2003, published 2003 by the American Helicopter Society International, Inc.
GB Examination Report for Application No. GB1403954.9, dated Jun. 30, 2015.
GB Combined Search Report dated Oct. 7, 2014 and Examination Report dated Oct. 8, 2014 for Application No. GB1403954.9.
Krantz, Timothy L.: "A Method to Analyze and Optimize the Load Sharing of Split Path Transmissions" National Aeronautics and Space Administration Cleveland OH Lewis Research Center, Sep. 1996.
Yang, Li-Fam, et al.: "Adaptive estimation of aircraft flight parameters for engine health monitoring system" Journal of aircraft, 2002, vol. 39, No. 3, pp. 404-408, published by American Institute of Aeronautics and Astronautics.

*Primary Examiner* — Gerald L Sung
*Assistant Examiner* — Scott Walthour
(74) *Attorney, Agent, or Firm* — Lorenz & Kopf, LLP (57) ABSTRACT

A system and method of adaptively synchronizing the performance margin of a multi-engine system includes continuously, and in real-time, determining the performance margin of a first engine and the performance margin of the second engine. A difference between the performance margins of the first and second engines is calculated, and the first and second engines are controlled to attain a predetermined difference between the performance margins of the first and second engines.

16 Claims, 4 Drawing Sheets

MULTI-ENGINE PERFORMANCE MARGIN SYNCHRONIZATION ADAPTIVE CONTROL SYSTEM AND METHOD

CROSS-REFERENCE TO RELATED APPLICATIONS

This application claims the benefit of the benefit of U.S. Provisional Application No. 61/804,836, filed Mar. 25, 2013.

TECHNICAL FIELD

The present invention generally relates to performance analysis, and more particularly relates to a system and method for adaptively controlling performance margin synchronization in a multi-engine system.

BACKGROUND

Helicopters typically have two engines that are connected through a combiner transmission to share the load of the rotor. It is desirable to share the load equally between the two engines so that the engines are more likely to deteriorate at the same (or similar) pace, and impart less stress to the combiner transmission. Helicopter engine controllers are typically configured to selectively implement one of a plurality load sharing control methods, and control logic that selects the control method. These control methods may include, for example, torque matching, a temperature matching, and a speed matching. With the torque matching method, measured engine torque is equalized, with the temperature matching method, measured engine temperatures are equalized, and with the speed matching method, measured engine speeds are equalized.

Unfortunately, none of the above-described control methods can continuously produce identical or synchronized performance margins for the two engines. Performance margin is an engine condition indicator and, as is generally known, is defined as the difference between one or more performance parameters at rated power and the corresponding limits of the performance parameters. As may be readily understood, because performance margin is measured at max rated power, two engines can have very different performance margins even if the engines have similar performance characteristics at lower power. Moreover, each engine will typically exhibit its own unique performance deterioration characteristics.

When the performance margin of an engine reaches zero, the engine is removed from the aircraft for repair, overhaul or replacement. Significant performance margin differences occur when a new or overhauled engine is installed with an engine that has already lost some performance margin. Thus, it is desirable to match the performance margins of both engines so that the engines can be simultaneously removed. However, the commonly used load sharing methods mentioned above do not ensure that the performance margins are matched. In particular, torque matching tends to cause the engine with a lower temperature margin to run hotter and increase the temperature margin split between the two engines. Temperature matching at part power does not guarantee that the temperature margins match at max rated power since the engines may have differently shaped temperature vs. torque characteristic curves. And speed matching at part power does not guarantee that the speed margins match at max rated power since the engines may have differently shaped speed vs. torque characteristic curves.

When the performance margins of two engines are not matched, this can lead to reduced engine life, reduced aircraft availability, and increased maintenance costs. Moreover, helicopter engine controls are typically configured such that a pilot may manually select the control method to be used in order to attain maximum power from both engines. This can lead to increased pilot workload. For example, if one engine reaches the temperature margin limit before the other engine while operating in the torque matching mode, the pilot will need to switch to the temperature matching mode to allow the other engine to attain its maximum power.

Hence, there is a need for a system and method of matching the performance margins of two engines. In doing so, the system and method will provide increased engine life, increased aircraft availability, reduced maintenance costs, and reduced pilot workload. The present invention addresses this need.

BRIEF SUMMARY

In one embodiment, a method of adaptively synchronizing the performance margin of a multi-engine system includes continuously, and in real-time, determining the performance margin of a first engine and the performance margin of the second engine. A difference between the performance margins of the first and second engines is calculated, and the first and second engines are controlled to attain a predetermined difference between the performance margins of the first and second engines.

In another embodiment, a system for adaptively synchronizing the performance margin of a multi-engine system includes a first engine, a second engine, a first engine controller, and a second engine controller. The first engine is configured to generate a first torque and has a determinable first engine performance margin. The second engine is configured to generate a second torque and has a determinable second engine performance margin. The first engine controller is coupled to, and is associated with, the first engine, and is configured to continuously, and in real-time, determine the first engine performance margin. The second engine controller is coupled to, and is associated with, the second engine, and is configured to continuously, and in real-time, determine the second engine performance margin. The first and second engine controllers are in operable communication with each other, and each is further configured to calculate a difference between the first engine performance margin and the second engine performance margin, and to control its associated engine to attain a predetermined difference between the first and second engine performance margins.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although embodiments are described herein as being implemented in a rotary-wing aircraft, such as a helicopter, it will be appreciated that the systems and methods described herein may be implemented in various other environments and applications that utilize a multi-engine output. Moreover, although embodiments are described herein as being implemented with two gas turbine engines, other numbers of engines greater than two could be used, and various other engine types, including diesel and combustion engines, may also be used.

Figure 1:
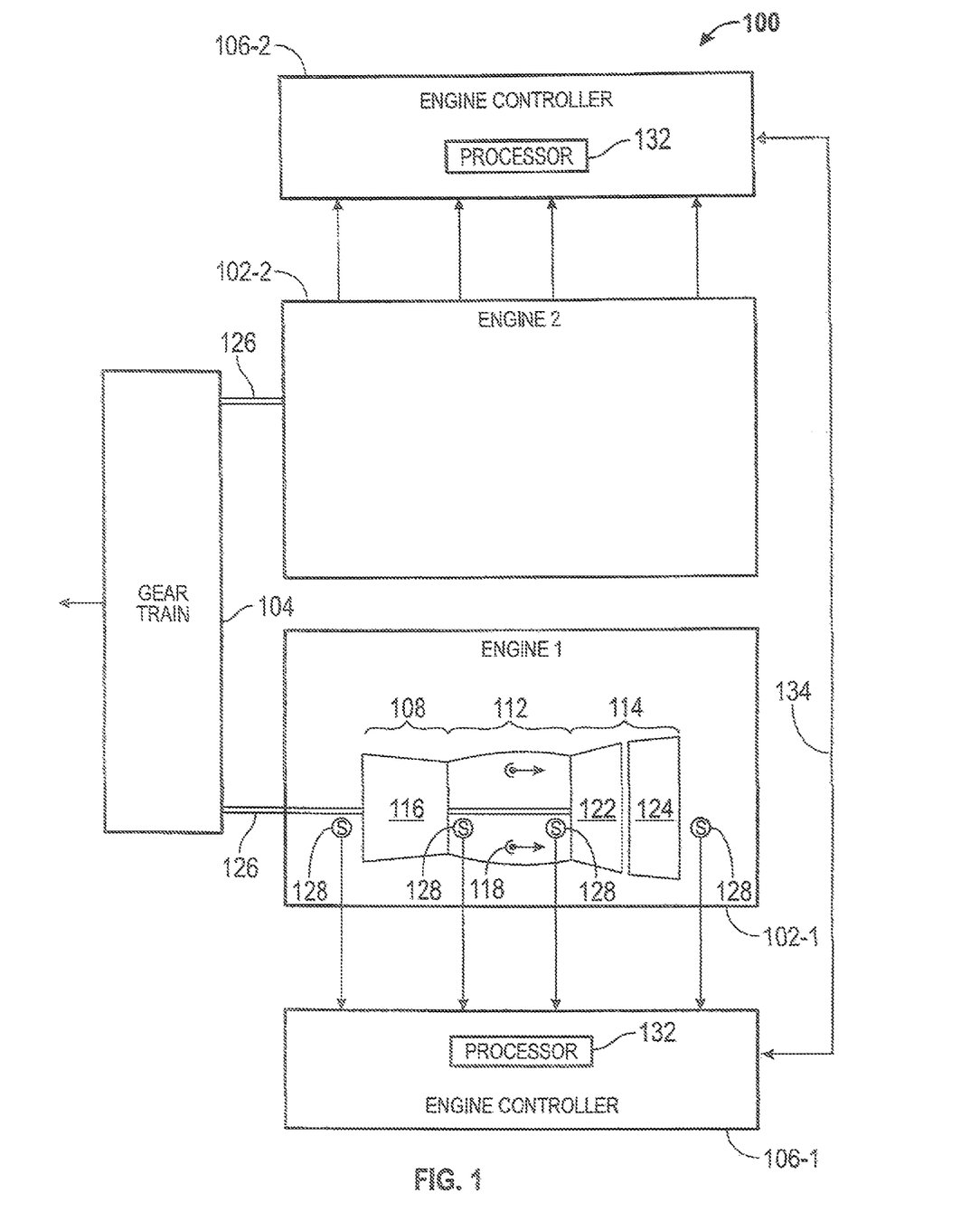
FIG. 1 depicts a functional block diagram of a portion of a multi-engine power train system for a rotary-wing aircraft.

Referring first to FIG. 1, a functional block diagram of a portion of a multi-engine power train system 100 for a rotary-wing aircraft, such as a helicopter, is depicted. The power train includes two engines 102 (a first engine 102-1 and a second engine 102-2), a gear train 104, and two engine controllers 106 (a first engine controller 106-1 and a second engine controller 106-2). It should be noted that although the system 100 of FIG. 1 is depicted as including only two engines 102, it could be implemented with more than this number of engines 102, if needed or desired.

The engines 102, at least in the depicted embodiment, are implemented using gas turbine engines, and more particularly single-spool turbo-shaft gas turbine propulsion engines. Thus, each engine 102 includes a compressor section 108, a combustion section 112, and a turbine section 114. The compressor section 108, which may include one or more compressors 116, draw air into its respective engine 100 and compresses the air to raise its pressure. In the depicted embodiment, each engine includes only a single compressor 116. It will nonetheless be appreciated that each engine 102 may include one or more additional compressors.

No matter the particular number of compressors 116 that are included in the compressor sections 108, the compressed air is directed into the combustion section 112. In the combustion section 112, which includes a combustor assembly 118, the compressed air is mixed with fuel supplied from a non-illustrated fuel source. The fuel and air mixture is combusted, and the high energy combusted air mixture is then directed into the turbine section 114.

The turbine section 114 includes one or more turbines. In the depicted embodiment, the turbine section 114 includes two turbines, a high pressure turbine 122 and a free power turbine 124. However, it will be appreciated that the engines 102 could be configured with more or less than this number of turbines. No matter the particular number, the combusted air mixture from the combustion section 112 expands through each turbine 122, 124, causing it to rotate an associated power shaft 126. The combusted air mixture is then exhausted from the engines 102. The power shafts 126 are each coupled to, and supply a drive torque to, the gear train 104.

The gear train 104 is coupled to receive the drive torque supplied from each of the engines 102. The gear train 104, which may include one or more gear sets, preferably includes at least a combiner transmission, which in turn supplies the combined drive torque to one or more rotors.

The engine controllers 106 are each in operable communication with one of the engines 102. In the depicted embodiment, for example, the first engine controller 106-1 is in operable communication with the first engine 102-1, and the second engine controller 106-2 is in operable communication with the second engine 106-2. Each engine controller 106 is configured, among other things, to control the operation of its associated engine 102 so as to minimize the performance margin difference between the engines 102. To implement this functionality, the engine controllers 106 are each coupled to receive various control and performance data from its associated engine 102. Thus, as FIG. 1 further depicts, each engine 102 additionally includes a plurality of sensors 128. Each of the sensors 128 is coupled to its associated engine controller 106 and is operable to sense an engine parameter and supply control and performance data representative of the sensed parameter to the engine controller 106. It will be appreciated that the particular number, type, and location of each sensor 128 may vary. It will additionally be appreciated that the number and types of control and performance data supplied by the sensors 128 may vary depending, for example, on the particular engine type and/or configuration. In the depicted embodiment, however, at least a subset of the depicted sensors 128 supply control and performance data representative of, or that may be used to determine, engine inlet pressure, engine inlet temperature, engine speed, fuel flow, compressor discharge pressure, power turbine inlet temperature, engine torque, shaft horsepower, and thrust, to name just a few.

The engine controllers 106 may be variously configured to implement the associated functionality. In the depicted embodiment, each engine controller 106 includes one or more processors 132 (for clarity, only one shown). The processors 132 are coupled to receive at least a portion of the control and performance data from the sensors 128 and are each configured, in response to these data, to continuously conduct performance analyses of its associated engine 102. Moreover, each engine controller 106 also receives various sensor data, such as torque, turbine inlet temperature, and engine speed, from the other engine controller 106 via a data link 134 that interconnects the two engine controllers 106. The processors 132 are additionally configured, based on the performance analyses, to control the operation of its associated engine 102 to minimize the difference between the performance margins of each engine 102. To do so, the processors 132 are each configured to conduct continuous, real-time performance analyses of its associated engine 102 to thereby continuously determine, in real-time, the performance margin of its associated engine 102. The processors 132 are additionally configured to implement identical feedback controllers that will shift the load between the engines 102 so that there is more load on the engine 102 with higher performance margin. One embodiment of the feedback controllers 200 are implemented in each of the processors 132 is depicted in FIG. 2, and will now be described in more detail.

Figure 2:
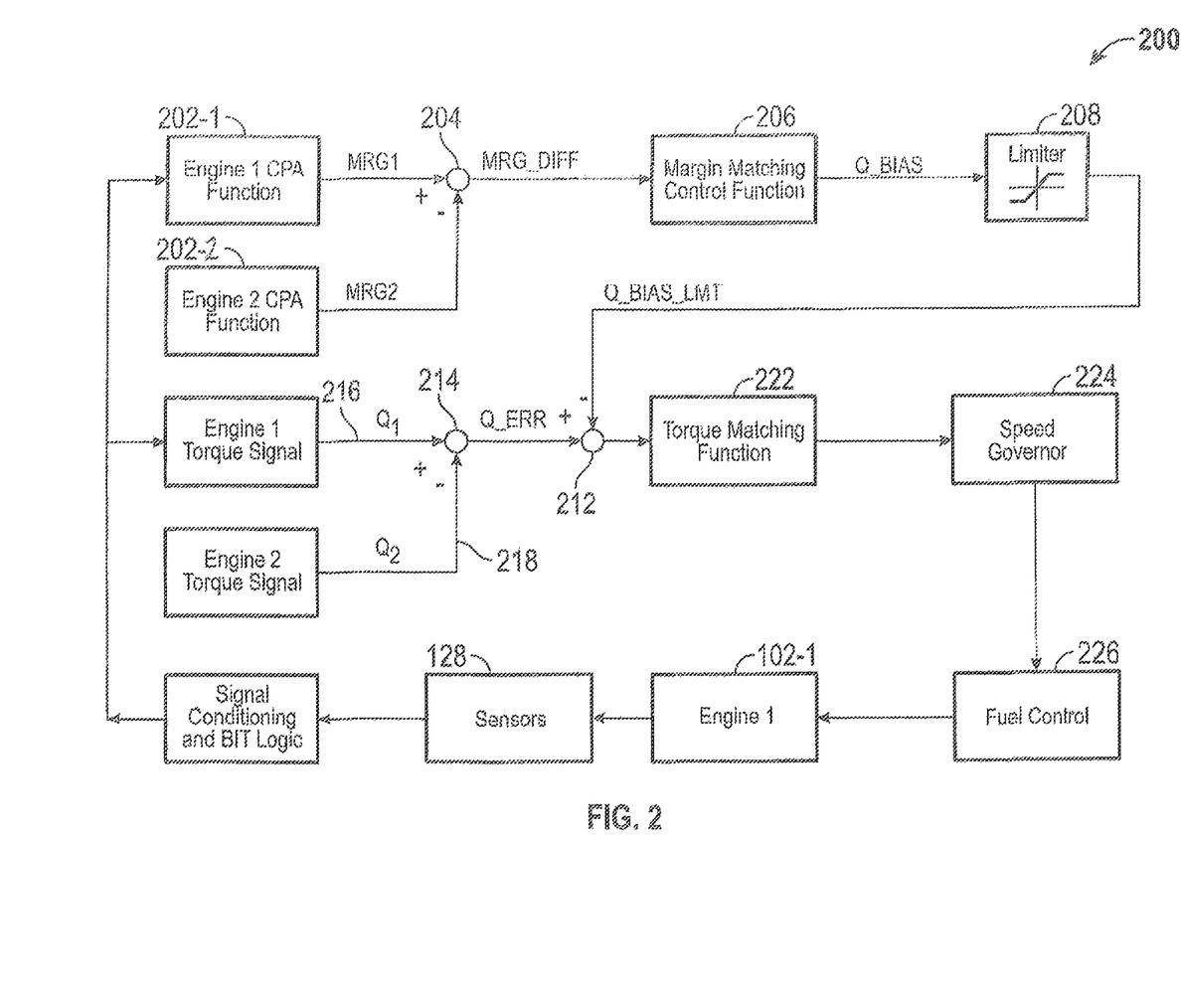
FIG. 2 depicts a functional block diagram of a feedback controller that may be implemented in the system of FIG. 1.

Before proceeding with the description, it is noted that the feedback controller 200 depicted in FIG. 2 is the one implemented in the first engine controller 106-1, and is thus associated with the first engine 102-1 (e.g., "Engine 1"). It will be appreciated that the feedback controller 200 implemented in the second engine controller 106-2, and thus associated with the second engine (e.g., "Engine 2") is an identical, "mirror-image," copy of the one implemented in the first engine controller 106-1. It is additionally noted that although the depicted feedback controller 200 is configured to implement a torque matching function, various other load matching functions may be implemented. For example, the feedback controller 200 may be configured to implement a load matching function based on temperature or speed, just to name a few.

Turning now to the description of the feedback controller 200, it is seen that the feedback controller 200 receives the control and performance data supplied by the sensors 128. The control and performance data are supplied, at least in the depicted embodiment, to signal conditioning and BIT (built-in-test) logic, which provides appropriate signal conditioning and testing of the data supplied from the sensors 128. At least a portion of the control and performance data are supplied to and processed by a continuous performance analysis (CPA) function 202-1. The CPA function 202-1 is configured to conduct continuous, real-time performance analyses of the first engine 102-1, and supply data representative of the instantaneous performance margin of the first engine 102-1. As FIG. 2 also depicts, the feedback controller 200 also receives, from a CPA function 202-2 in the feedback controller 200 of the second engine controller 106-2, data representative of the instantaneous performance margin of the second engine 102-2.

Before proceeding further, it is additionally noted that the continuous, real-time performance analyses conducted by the CPA functions 202 may be implemented using any suitable algorithm capable of supplying instantaneous performance margins. Preferably, however, the continuous, real-time performance analyses are preferably conducted using the methodology described in U.S. Pat. No. 8,068,997, entitled "Continuous Performance Analysis System and Method," and assigned to the assignee of the instant application. The entirety of this patent, which issued on Nov. 29, 2011, is hereby incorporated by reference.

Returning now to the description of the feedback controller 200, the instantaneous performance margins of each engine (MRG1, MRG2) are supplied to a first difference function 204. The first difference function 204 determines a performance margin difference (MRG_DIFF) between the two engines 102, and supplies the determined performance margin difference (MRG_DIFF) to a margin matching control function 206. The margin matching control function 206 is configured, in response to the performance margin difference (MRG_DIFF), to generate and supply a torque bias signal (Q_BIAS). Though not depicted in FIG. 2, it should be noted that the instantaneous performance margins supplied from the CPA functions 202-1, 202-2 may be filtered to remove noise. If not adequately filtered, noise in the instantaneous performance margins can cause undesirable swings in the torque bias signal (Q_BIAS). It will be appreciated that the margin matching control function 206 may be implemented using any one of numerous types of controllers. In a particular preferred embodiment, the margin matching control function 206 is implemented as a proportion-plus-integral (PID) controller. This is because the proportional action provides relatively fast and measured correction, the integral action eliminates any steady state error of synchronization, and the derivative action provides anticipatory correction to avoid overshoot and hunting issues.

No matter how the margin matching control function 206 is implemented, the torque bias signal (Q_BIAS), at least in the depicted embodiment, is supplied to a limiter 208. The limiter 208, as is generally known, is configured to limit the torque bias signal supplied from the margin matching control function 206. In particular, it is configured to limit the torque bias signal to less than the maximum allowable torque split between the first and second engines 102-1, 102-2. The limit values may vary, but are preferably chosen to limit stress to the gear train 104. The limited torque bias signal (Q_BIAS_LMT) is supplied to a second difference function 212.

The second difference function 212 is coupled to receive, in addition to the limited torque bias signal (Q_BIAS_LMT), a torque matching error signal (Q_ERR). The torque matching error signal (Q_ERR) is supplied from a third difference function 214, which receives, and determines the difference between, a first engine torque signal 216 and a second engine torque signal 218. The determined difference is supplied as the torque matching error signal (Q_ERR). As may be appreciated, the first engine torque signal 216 is a signal representative of the instantaneous torque (Q1) being supplied by the first engine 102-1, and the second engine torque signal 218 is a signal, supplied from the second engine controller 106-2, representative of the instantaneous torque (Q2) being supplied by the second engine 102-2.

The output of the second difference function 212 is supplied to a torque matching function 222. The torque matching function 222 is preferably configured to implement a conventionally known torque matching algorithm. It will be appreciated, however, that any one of numerous torque matching algorithms developed in the future could also be used. The torque matching function 222 supplies a speed control signal to the speed governor 224 in the first engine 102-1, which in turn supplies a fuel control signal to a fuel control function 226. The fuel control function 226, which is implemented in the first engine controller 106-1, supplies appropriate commands to appropriate control devices to meter an appropriate amount of fuel to the first engine 102-1.

From the above description it may be readily understood that when there is a non-zero performance margin difference between the first and second engines 102-1, 102-2, the feedback controllers 200 use the determined performance margin difference (MRG_DIFF) to purposely create, within acceptable torque split limits, a load imbalance. The feedback controllers 200 are also configured to indirectly control load shifting via the torque matching function 222. In particular, the feedback controllers 200 supply the limited torque bias signal (Q_BIAS_LMT) to the torque matching error signal (Q_ERR) such that both engines will settle into a desirable unbalanced load condition as long as performance margin difference exists between the two engines 102.

For completeness, a brief description of the operation of the system 100 implementing the feedback controllers 200 will be provided. Initially, it is assumed that the instantaneous performance margins (MRG1, MRG2) of the first and second engines 102-1, 102-2 are equal (or at least substantially equal). Such a situation may occur, for example, when both engines 102 are new. As a result, the performance margin difference (MRG_DIFF) will be zero and the limited torque bias signal (Q_BIAS_LMT) supplied to the second difference function 212 will also be zero. This will result in the first and second engines 102-1, 102-2 being controlled in accordance with a conventional torque matching control loop. If any divergence in the performance margins (MRG1, MRG2) of the first and second engines 102-1, 102-2 occurs, the feedback controllers 200 will implement immediate corrective action to drive the performance margin difference (MRG_DIFF) to zero in closed-loop fashion.

Figure 3:
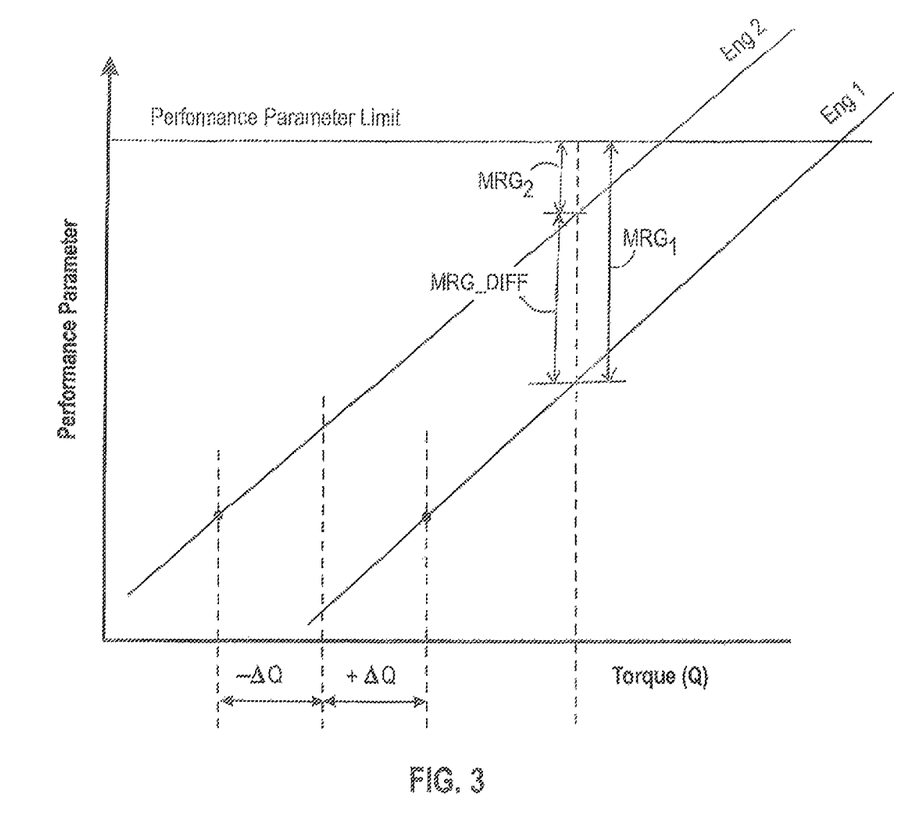
FIG. 3 graphically depicts the multi-engine power train system of FIG. 1 operating with imbalanced performance margins.
Figure 4:
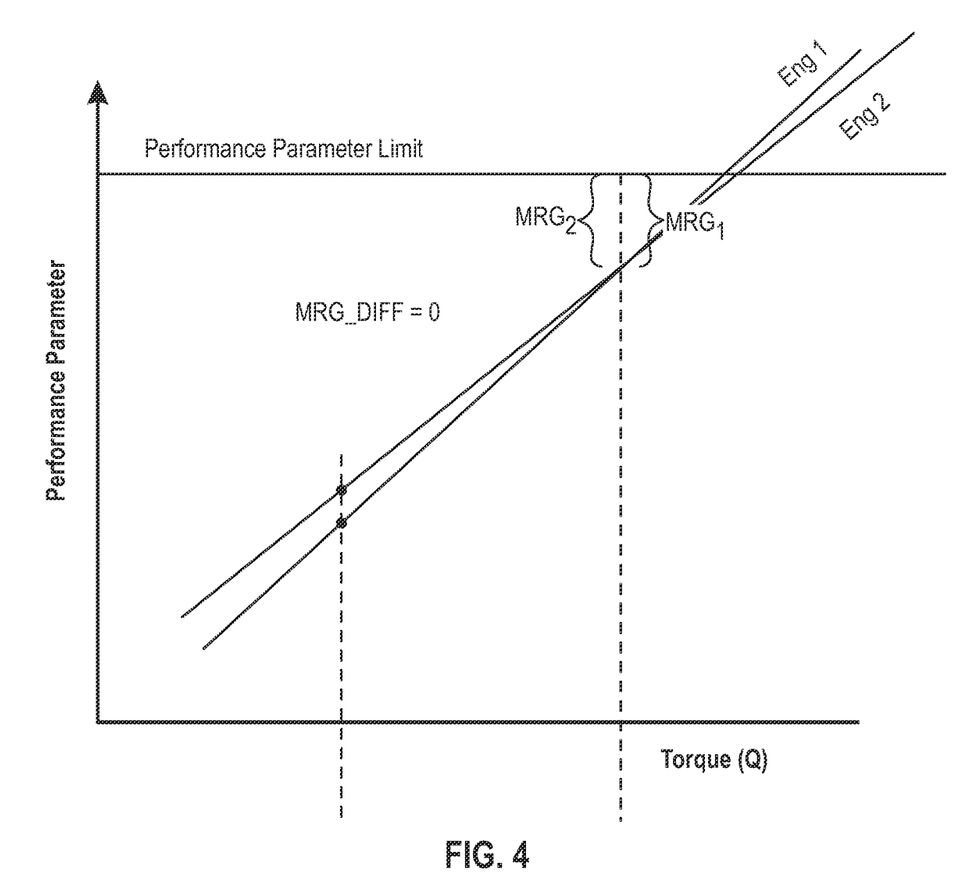
FIG. 4 graphically depicts the multi-engine power train system of FIG. 1 operating with balanced performance margins.

For example, as graphically depicted in FIG. 3, the performance margin (MRG2) of the second engine 102-2 has decreased faster and becomes smaller relative to the performance margin (MRG1) of the first engine 102-1. As a result, the performance margin difference (MRG_DIFF) will be non-zero and the limited torque bias signal (Q_BIAS_LMT) supplied to the second difference function 212 will also be non-zero. More specifically, the margin matching control function 206 associated with the first engine 102-1, which has the higher performance margin, will supply a positive value for the torque bias signal (Q_BIAS) and the limited torque bias signal (Q_BIAS_LMT), such that it will reduce the torque error value (Q_ERR) before it is used in the torque matching function 222. This operation has an equivalent effect of lowering the torque signal value of the first engine and thus causes the torque matching function 222 to increase the power and load share of the first engine 102-1. The opposite will occur in the feedback controller 200 associated with the second engine 102-2, which has the lower performance margin. Thus, a desirable torque split condition is purposely created as a result of the power imbalance of the first and second engines 102. Because the first engine 102-1 (the higher performance margin engine) now has a greater power usage than the second engine 102-2 (the lower performance margin engine), the first engine 102-1 will degrade faster than the second engine 102-2. As FIG. 4 depicts, over time this will result in the performance margin differences of the two engines 102 converging to zero (e.g., MRG1=MRG2). Once the performance margins are matched, the feedback controllers 200 will continue to keep them matched until both engines 102 are fully degraded.

It should be noted that in some contexts, such as certain helicopter engine control systems, even though the engine with lower performance margin will bias its associated torque signal to a higher value, it will not decrease the engine power directly. This is because the torque matching control loops in some helicopter do not allow lowering the power of the high torque signal engine. Thus, the increased power to the engine with the higher performance margin will result in the speeds of both engines increasing, and further result in a power reduction from the speed governor of the lower performance margin engine.

It is generally known that various parameters can be used as a measure of performance margin. For example, in the context of gas turbine engines, turbine inlet temperature and turbine speed can be used. Although multiple performance margin types could be used in the feedback controllers 200, it is preferable to choose one margin type for synchronization, rather than switching among a plurality of different margin types. Different types of performance margins (e.g., temperature margin, speed margin, etc.) typically move in the same direction. Thus, if one performance margin type is in synch, then the other types are likely to be in synch (or at least closely in sync). Moreover, it is preferable to choose the performance margin type that reaches its performance limit more frequently and/or cause more engine removals. In the context of a helicopter, the turbine inlet temperature margin is typically chosen because it meets these criteria.

The system and method described herein provides numerous significant benefits for various multi-engine systems, such as multi-engine helicopters. In particular, the system and method provides reduced maintenance cost, reduced pilot workload, increased engine life, and increased aircraft availability. Maintenance costs can be reduced since the removal of engines with small performance margins, which are often removed along with fully degraded engines, can be avoided, and because only a single maintenance test flight is needed after engine replacements. Pilot workload is reduced since the pilot does not need to manually switch from one load sharing method to another in order to get maximum power from both engines when one engine reaches a performance limit before the other. Engine life is increased since two engines with matched performance margins will experience lower maximum temperature and speed during transients than unmatched engines over their life span. As a result, the rate of damage to hot section life-limited components, which accelerates at higher engine speed and temperature, will be reduced. Moreover, the rate of performance degradation, which also accelerates at higher engine speed and temperature, is reduced due to slower surface oxidation or blade tip deformation. Aircraft availability is increased since aircraft downtime for fully degraded engine removal and replacement is reduced by 50 percent, since two maintenance events are reduced to just one.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of adaptively synchronizing performance margins of a multi-engine system, the method comprising the steps of:
   continuously, and in real-time, determining a performance margin of a first engine and a performance margin of a second engine;
   calculating a difference between the performance margins of the first and second engines;
   creating a load imbalance between the first and second engines whenever the calculated difference between the performance margins of the first and second engines is non-zero; and
   controlling the first and second engines to attain a predetermined difference between the performance margins of the first and second engines.

2. The method of claim 1, further comprising:
   continuously determining a control parameter of the first engine and a control parameter of the second engine; and
   calculating a difference between the control parameters of the first and second engines to thereby determine a control parameter difference.

3. The method of claim 2, wherein the first and second engines are controlled based in part on the control parameter difference.

4. The method of claim 2, further comprising:
   generating a bias signal from the calculated difference between the performance margins.

5. The method of claim 4, further comprising:
   limiting the bias signal to a maximum allowable split between the first and second engines.

6. The method of claim 5, wherein the first and second engines are controlled based on the control parameter difference and the bias signal.

7. The method of claim 1, wherein one or more of turbine inlet temperature at a first predefined power condition or turbine speed at a second predefined power condition is used in the determining of the performance margins of the first and second engines.

8. The method of claim 2, wherein the control parameter of the first engine and the control parameter of the second engine are each one or more of torque, turbine inlet temperature, and turbine speed.

9. A system for adaptively synchronizing performance margins of a multi-engine system, comprising:
   a first engine configured to generate a first torque and having a determinable first engine performance margin;
   a second engine configured to generate a second torque and having a determinable second engine performance margin;
   a first engine controller coupled to, and associated with, the first engine, the first engine controller configured to continuously, and in real-time, determinable the first engine performance margin; and
   a second engine controller coupled to, and associated with, the second engine, the second engine controller configured to continuously, and in real-time, determine the determinable second engine performance margin,
   wherein the first and second engine controllers are in operable communication with each other, and each of the first and second engine controllers is further configured to:
      calculate a difference between the determinable first engine performance margin and the determinable second engine performance margin;
      create a load imbalance between the first and second engines whenever the calculated difference between the determinable first performance margin of the first engine and the determinable second performance margin of the second engine is non-zero; and
      control the first and second engines, respectively, to attain a predetermined difference between the determinable first performance margin of the first engine and the determinable second performance margin of the second engine.

10. The system of claim 9, wherein the first and second engine controllers are each:
coupled to receive a first signal representative of a control parameter of the first engine and a second signal representative of a control parameter of the second engine; and
further configured to calculate a difference between the control parameters of the first and second engines to thereby generate a control parameter difference.

11. The system of claim 10, wherein the first and second engine controllers are each configured to control the first and second engines, respectively, based in part on a calculated torque difference.

12. The system of claim 10, wherein the first and second engine controllers are each further configured to generate a bias signal from the calculated difference between the determinable first engine performance margin and the second determinable engine performance margin.

13. The system of claim 12, wherein the first and second engine controllers are each further configured to limit the bias signal to a maximum allowable split between the first and second engines.

14. The system of claim 12, wherein the first and second engine controllers are each further configured to control the first and second engines, respectively, based on the calculated control parameter difference and the bias signal.

15. The system of claim 9, wherein one or more of turbine inlet temperature at a first predefined power condition or turbine speed at a second predefined power condition is used in the determining of the determinable first performance margin of the first engine and the determinable second performance margin of the second engine.

16. The system of claim 9, wherein the control parameter of the first engine and the control parameter of the second engine are each one or more of torque, turbine inlet temperature, and turbine speed.

* * * * *